US006869756B2

(12) United States Patent
Ogawa et al.

(10) Patent No.: US 6,869,756 B2
(45) Date of Patent: Mar. 22, 2005

(54) HEAT DEVELOPING METHOD AND HEAT DEVELOPING APPARATUS

(75) Inventors: Masaharu Ogawa, Kanagawa (JP); Toshitaka Agano, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 2 days.

(21) Appl. No.: 10/401,533

(22) Filed: Mar. 31, 2003

(65) Prior Publication Data

US 2003/0202793 A1 Oct. 30, 2003

Related U.S. Application Data

(60) Division of application No. 10/146,032, filed on May 16, 2002, which is a continuation-in-part of application No. 09/538,975, filed on Mar. 31, 2000, now abandoned.

(30) Foreign Application Priority Data

Mar. 31, 1999 (JP) ....................................... P. 11-094022

(51) Int. Cl.[7] ........................... G03C 5/16; G03B 13/00

(52) U.S. Cl. ....................... 430/350; 430/348; 396/568; 396/571; 396/572; 396/575; 396/578

(58) Field of Search ................................ 430/350, 619, 430/203, 296, 348; 396/575, 568, 571, 572, 578

(56) References Cited

U.S. PATENT DOCUMENTS

| | | | | |
|---|---|---|---|---|
| 4,325,629 A | | 4/1982 | Ogata et al. | |
| 5,774,204 A | | 6/1998 | Suzuki et al. | |
| 5,887,212 A | * | 3/1999 | Ozaki et al. | 396/575 |

FOREIGN PATENT DOCUMENTS

| | | |
|---|---|---|
| JP | 11-65073 | 3/1999 |
| JP | 2000-284459 | 10/2000 |

* cited by examiner

*Primary Examiner*—Thorl Chea
(74) *Attorney, Agent, or Firm*—Sughrue Mion, PLLC

(57) ABSTRACT

A heat developing method having the steps of: initially making the overall surface of a heat developing photosensitive material or a photosensitive and thermosensitive recording material (hereinafter called a "heat developing recording material") to a predetermined temperature not lower than a glass transition temperature and not higher than heat development start temperature; and performing heat development.

5 Claims, 3 Drawing Sheets

HEAT DEVELOPING METHOD AND HEAT DEVELOPING APPARATUS

This is a divisional of application Ser. No. 10/146,032 filed May 16, 2002, which is a Continuation-In-Part Application of U.S. application Ser. No. 09/538,975 filed Mar. 31, 2000 (now abandoned); the above noted prior applications are all hereby incorporated by reference.

BACKGROUND OF THE INVENTION

1. Field of the Invention

The present invention relates to a heat developing apparatus for heating a heat developing photosensitive material or a photosensitive and thermosensitive recording material to perform heat development.

2. Description of the Related Art

As an image recording apparatus for recording an image for medical use in, for example, a digital radiography system, a CT or an MR, a wet system has been used with which an image is photographed or recorded on a silver-salt photosensitive material and after which a wet process is performed to obtain a reproduced image.

On the other hand, a recording apparatus in the form of a dry system with which no wet process is performed has attracted attention in recent years. A recording apparatus of the foregoing type uses a photosensitive and thermosensitive recording material (a photosensitive and thermosensitive recording material) or a heat developing photosensitive material (hereinafter called a "heat developing recording material"). The dry recording apparatus incorporates an exposing portion in which the heat developing recording material is irradiated with a laser beam (that is, scanned) so that a latent image is formed. Then, the heat developing portion brings the heat developing recording material into contact with a heating means so that heat development is performed. Then, the heat developing recording material is cooled, and then the heat developing recording material having an image formed thereon is discharged to the outside of the apparatus.

The heat development performed by the heat developing portion is performed such that the heat developing recording material, the temperature of which is substantially the room temperature, is heated to a level not lower than the heat development start temperature. Then, the temperature is maintained for a predetermined period of time. Hitherto, a heat developing apparatus incorporates a heating means, such as hot air, infrared rays, a heating drum, a heating plate or a heating roller, for heating and developing the heat developing recording material has been known (Japanese Patent Application No. 9-229643).

However, heat conduction in the heat developing portion cannot always uniformly be performed. Therefore, the heat hysteresis differs among the portions of the heat developing recording material. As a result, there is apprehension that irregularity of development occurs. The reason why the heat conduction cannot uniformly be performed has been detected as follows.

The cause of the problem experienced with the conventional apparatus will now be described with reference to FIG. 2.

Referring to FIG. 2, FIG. 2(*a*) is a diagram showing change in the state of the heat developing recording material placed on a heating plate which is the heating means, the change occurring as time elapses.

FIG. 2(*b*) is a graph showing change in the temperatures at points A and B of the heat developing recording material occurring as time elapses.

FIG. 2(*c*) is a diagram showing the sizes (the densities) of recorded dots developed on the points A and B.

Referring to FIG. 2, the heat developing recording material, the temperature of which is the room temperature, is placed on the heater so as to be heated. In a state at time t1 shown in FIG. 2(*a*), the irregularity of the thickness of the base of the heat developing recording material, that of the density of the material of the base, a state of asperities of the heat developing recording material and irregularity of the heat distribution of the heater causes portions which are intensely heated and portions which are heated weakly to be realized.

As a result, the portions of the heat developing recording material heated intensely (the point A of the heat developing recording material) are quickly heated to the glass transition temperature TG (see FIG. 2(*b*)). On the other hand, portions of the heat developing recording material heated weakly (the point B of the heat developing recording material) are slowly heated to the glass transition temperature TG.

The portions (the point A) of the heat developing recording material quickly heated to the glass transition temperature lose rigidity quickly. Therefore, the foregoing portions are brought into furthermore hermetic contact with the heater so that greater heat is exerted to the foregoing portions. Therefore, the portions are quickly heated to the development start temperature TH (time t1 shown in FIG. 2(*b*)). On the other hand, the portions of the heat developing recording material which are heated weakly (the point B) are slowly heated to the glass transition temperature TG. Therefore, the foregoing portions are slowly heated to the development start temperature at time t2 shown in FIGS. 2(*a*) and (*b*).

Assuming that the time at which the development of the points A and B is stopped is t4 (see FIG. 2(*b*)), development time tA at which the point A is developed is expressed by equation (1) and development time tB at which the point B is developed is expressed by equation (2).

$$tA=t4-t1 \quad (1)$$

$$tB=t4-t2 \quad (2)$$

Since tA and tB satisfy equation (3)

$$tA>tB \quad (3)$$

Therefore, the sizes of the recorded dot of the points A and B are as shown in FIG. 2(*c*). Thus, the point A is formed into a larger dot and has a high density as compared with the point B. Therefore, irregular development takes place over the whole heat developing recording material.

To achieve the foregoing problem, an object of the present invention is to provide a heat developing method with which occurrence of irregularity of heat development can be prevented over the surface of the heat developing recording material and an apparatus therefor.

SUMMARY OF THE INVENTION

To solve the above-mentioned problem, according to one aspect of the present invention, there is provided a heat developing method comprising the steps of: initially making the overall surface of a heat developing photosensitive material or a photosensitive and thermosensitive recording material a predetermined temperature not lower than a glass transition temperature and not higher than a heat development start temperature; and performing heat development.

According to another aspect, the predetermined temperature is slightly lower than the heat development start temperature.

According to another aspect, the method further comprises a step of transferring the heat developing recording material to the beat development wherein said predetermined temperature is slightly lower than a heat developing portion kept at a heat developing temperature.

According to another aspect heat is independently applied in the widthwise direction of the heat developing recording material.

According to another aspect, the step of heating a plurality of portions comprises the step of heating a portion at the widthwise end that is stronger than other portions of said heat developing recording material.

According to another aspect, there is provided a heat developing apparatus comprising: a heat developing apparatus that includes a recording portion for exposing a heat developing recording material or a photosensitive and thermosensitive recording material (hereinafter called a "heat developing recording material") to form a latent image; and a heat developing portion for heating said heat developing recording material by a heating medium thereof to perform heat development, wherein a previously-heating portion for heating the overall surface of said heat developing recording material to a temperature not lower than a glass transition temperature and not higher than heat development start temperature, a plurality of thermosensors for sampling the temperatures of the overall surface of said heat developing recording material, and a comparator for performing a comparison whether or not all of the temperatures detected by said thermosensors have been raised to said predetermined temperature are disposed between said recording portion and said heat developing portion, wherein after said comparator has detected that all of the temperatures detected by said thermosensors and said predetermined temperature substantially coincide with one another, said developing operation is started.

According to another aspect, there is provided a heat developing apparatus comprising: a recording portion for exposing a heat developing recording material or a photosensitive and thermosensitive recording material to form a latent image; a heat developing portion for heating the heat developing recording material by a heating medium thereof to perform heat development; and conveying means for conveying the heat developing recording material from the recording portion to the heat developing portion, wherein a previously-heating portion for heating the overall surface of the heat developing recording material to a temperature not lower than a glass transition temperature and not higher than heat development start temperature, a plurality of thermosensors for sampling the temperatures of the overall surface of the heat developing recording material, and a comparator for performing a comparison whether or not all of the temperatures detected by the thermosensors have been raised to the predetermined temperature are disposed between the recording portion and the heat developing portion, and when the comparator has detected that all of the temperatures detected by the thermosensors and the predetermined temperature substantially coincide with one another, the conveying means starts operating.

According to another aspect, the previously heating portion is divided into a plurality of sections in the widthwise direction of the heat developing recording material and controlled such that the temperatures of the sections are independently controlled.

According to another aspect, heating portions of the previously heating portion divided into the plural sections disposed at the two ends of the heat developing recording material in the widthwise direction are controlled to apply greater heat as compared with heating portions disposed in the central portion of the heat developing recording material in the widthwise direction.

According to another aspect, there is provided a heat developing apparatus comprising: a recording portion for exposing a heat developing recording material or a photosensitive and thermosensitive recording material to form a latent image; a heat developing portion for heating the heat developing recording material by a heating medium thereof to perform heat development; and a heating control portion which is capable of controlling the heat of said heat developing portion to two temperature levels including a first heating temperature not lower than a glass transition temperature and not higher than heat development start temperature and a second heating temperature not lower than the heat development start temperature, wherein a plurality of thermosensors disposed in the heat developing portion and arranged to sample the temperatures of the overall surface of the heat developing recording material, and a comparator for performing a comparison between the temperatures detected by the thermosensors and the first heating temperature, and when the comparator has detected that all of the temperatures detected by the thermosensors and the first heating temperature have substantially coincided with one another after an operation for controlling the first heating temperature has been started, the heating control portion issues a command to start a control operation of the second heat temperature.

The heat developing method and the apparatus therefor enable the overall surface of the heat developing recording material to uniformly be made to be the predetermined temperature not lower than a glass transition temperature and not higher than heat development start temperature. Therefore, the overall surface of the heat developing recording material can uniformly contact with the plate heater. Therefore, the overall surface of the heat developing recording material is free from irregularity of the heat development.

Other objects, features and advantages of the invention will be evident from the following detailed description of the preferred embodiments described in conjunction with the attached drawings.

DESCRIPTION OF THE PREFERRED EMBODIMENT

An embodiment of the present invention will now be described with reference to FIG. 1.

Figure 1A:
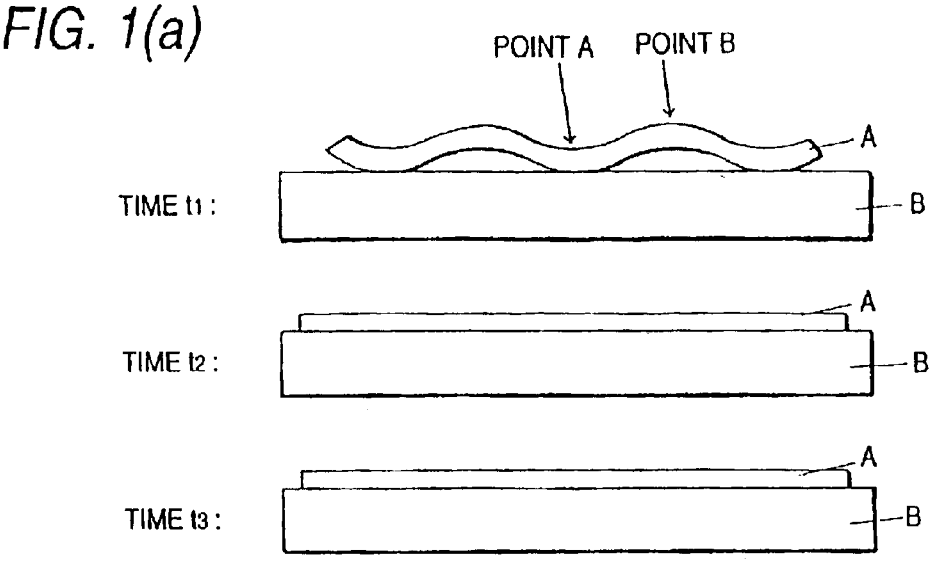
FIG. 1 is a diagram showing change in the state of a heat developing recording material in the heat developing apparatus according to the present invention, in which FIG. 1(*a*) is a diagram showing change in the state of the heat developing recording material placed on a heating plate which is a heating means, the change occurring as time elapses, FIG. 1(*b*) is a diagram showing change in the temperatures at points A and B of the heat developing recording material as time elapses and FIG. 1(*c*) is a diagram showing sizes of recorded dots (densities) developed on the points A and B.
Figure 1B:
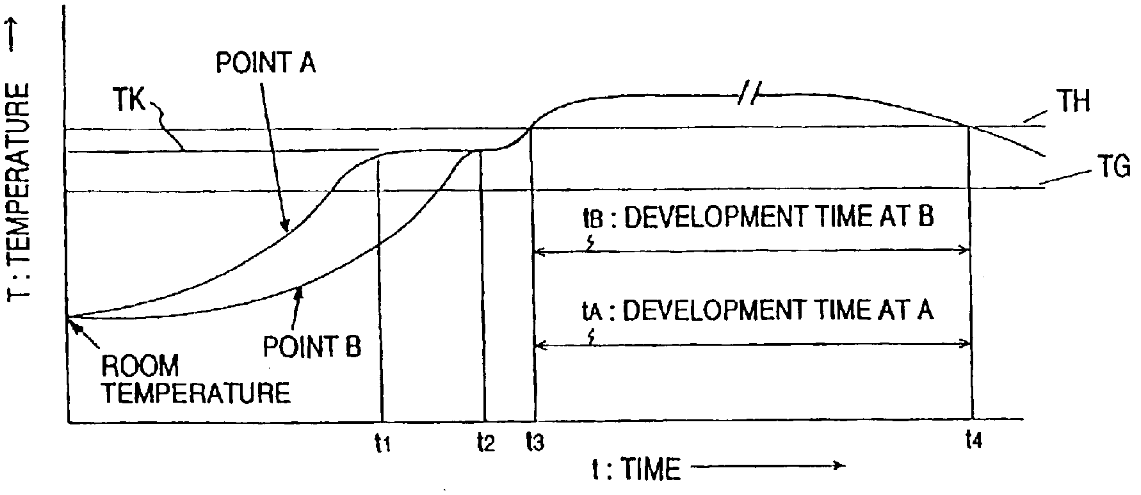
Figure 1C:
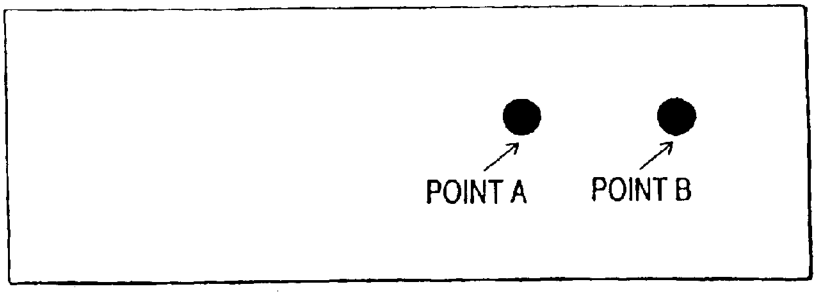
Figure 2A:
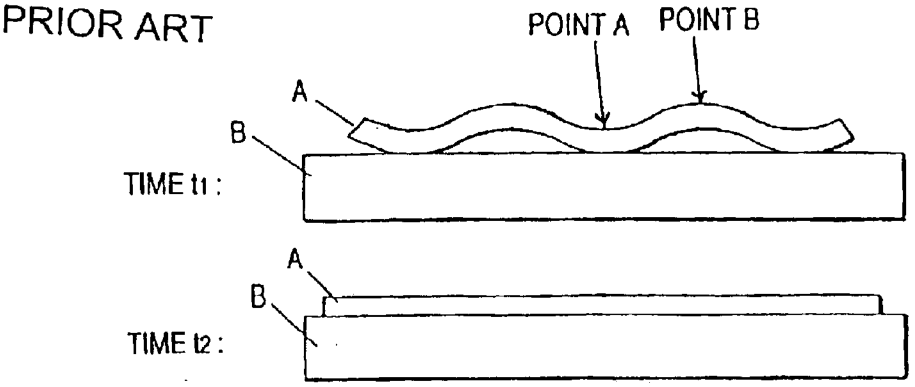
FIG. 2(a) PRIOR ART
FIG. 2 is a diagram showing change in the state of the heat developing recording material in the conventional heat developing apparatus, in which FIG. 2(*a*) is a diagram showing change in the state of the heat developing recording material placed on the heating plate which is the heating means, the change occurring as times elapses, FIG. 2(*b*) is a diagram showing change in the temperatures at points A and B of the heat developing recording material shown in FIG. 2(*a*) as time elapses and FIG. 2(*c*) is a diagram showing sizes of recorded dots (densities) developed on the points A and B.
Figure 2B:
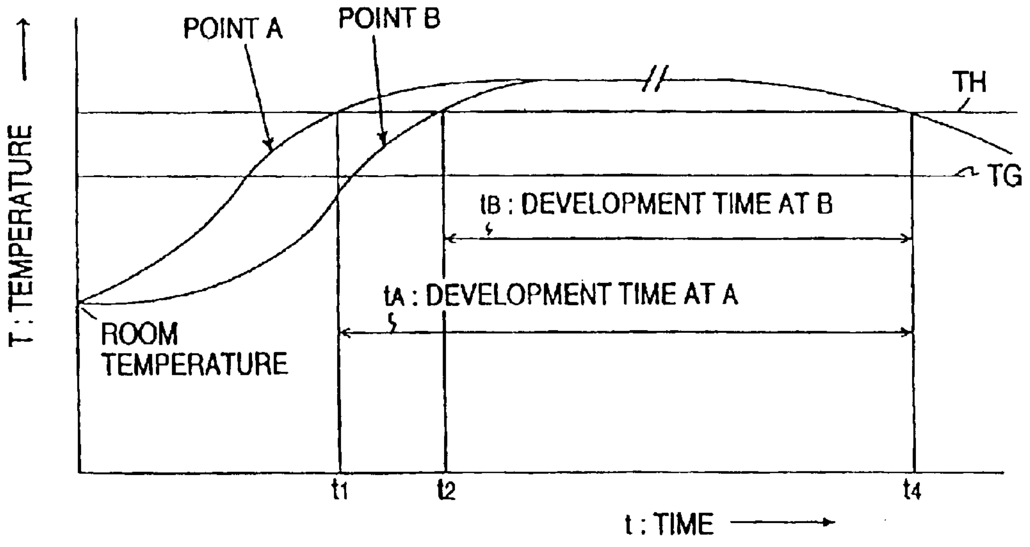
FIG. 2(b) PRIOR ART
Figure 2C:
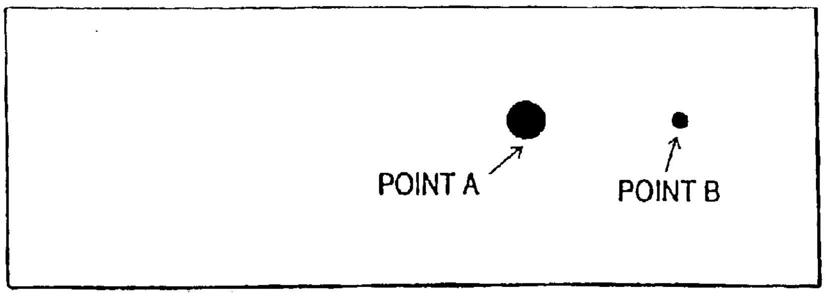
FIG. 2(c) PRIOR ART

Referring to FIG. 1, FIG. 1(*a*) is a diagram showing change in the state of the heat developing recording material placed on a heating plate which is the heating means, the change occurring as time elapses.

FIG. 1(*b*) is a graph showing change in the temperatures at points A and B of the heat developing recording material shown in FIG. 1(*a*) occurring as time elapses.

FIG. 1(*c*) is a diagram showing the sizes (the densities) of recorded dots developed on the points A and B.

The present invention has a structure that the overall surface of the heat developing recording material A is first uniformly made to be a predetermined temperature TK not lower than a glass transition temperature TG and not higher than heat development start temperature TH. In particular, the temperature is slightly lower than the heat development start temperature. Then, the heat development is performed. In FIG. 1(*a*), "A" designates a developing recording material. In a practical use, a developing recording material is applied on a base layer. The base layer is formed in a sheet, for example, and made of Polyethylene Terephthalate resin (PET). Moreover, the glass transition temperature is generally defined depending on a material of the base layer.

Referring to FIG. 1, the heat developing recording material A, the temperature of which is the room temperature, is placed on a heater so as to be heated. In a state at time t1 shown in FIG. 1(*a*), irregularity of the rigidity of the heat developing recording material, that of the thickness of the base of the same, that of the density of the material of the base, a state of asperities of the heat developing recording material and irregularity of the heat distribution of the heater causes portion A which is intensely heated and portion B which is heated weakly to be realized.

However, the present invention has the structure that the overall surface of the heat developing recording material is first uniformly made to be a predetermined temperature TK not lower than a glass transition temperature TG and not higher than heat development start temperature TH. In particular, the temperature is slightly lower than the heat development start temperature (refer to time t2 shown in FIG. 1(*b*)). As a result, the rigidity of the heat developing recording material is decreased, causing asperities to be removed. Both of the points A and B can be made uniformly in contact with the surface of the heating plate (refer to t2 of FIG. 1(*a*)).

Then, the heat developing recording material is heated to a level not lower than the heat development start temperature, both of the points A and B, which re made uniformly in contact with the surface of the heating portion, are simultaneously heated to the heat development start temperature TH (time t3 shown in FIG. 1(*b*)).

Assuming that the time at which development of the points A and B is t4 (see FIG. 1(*b*), development time tA for point A is expressed by equation (3) and development time tB is expressed by equation (4).

$$tA=t4-t3 \tag{3}$$

$$tB=t4-t3 \tag{4}$$

Since tA and tB satisfy equation (5), $$tA=tB \tag{5}$$

Therefore, the sizes of the points A and B are as shown in FIG. 1(*c*). The sizes of the dots of the point A and the point B are the same. As a result, the overall surface of the heat developing recording material can be made to be free from irregularity in the development.

Figure 3:
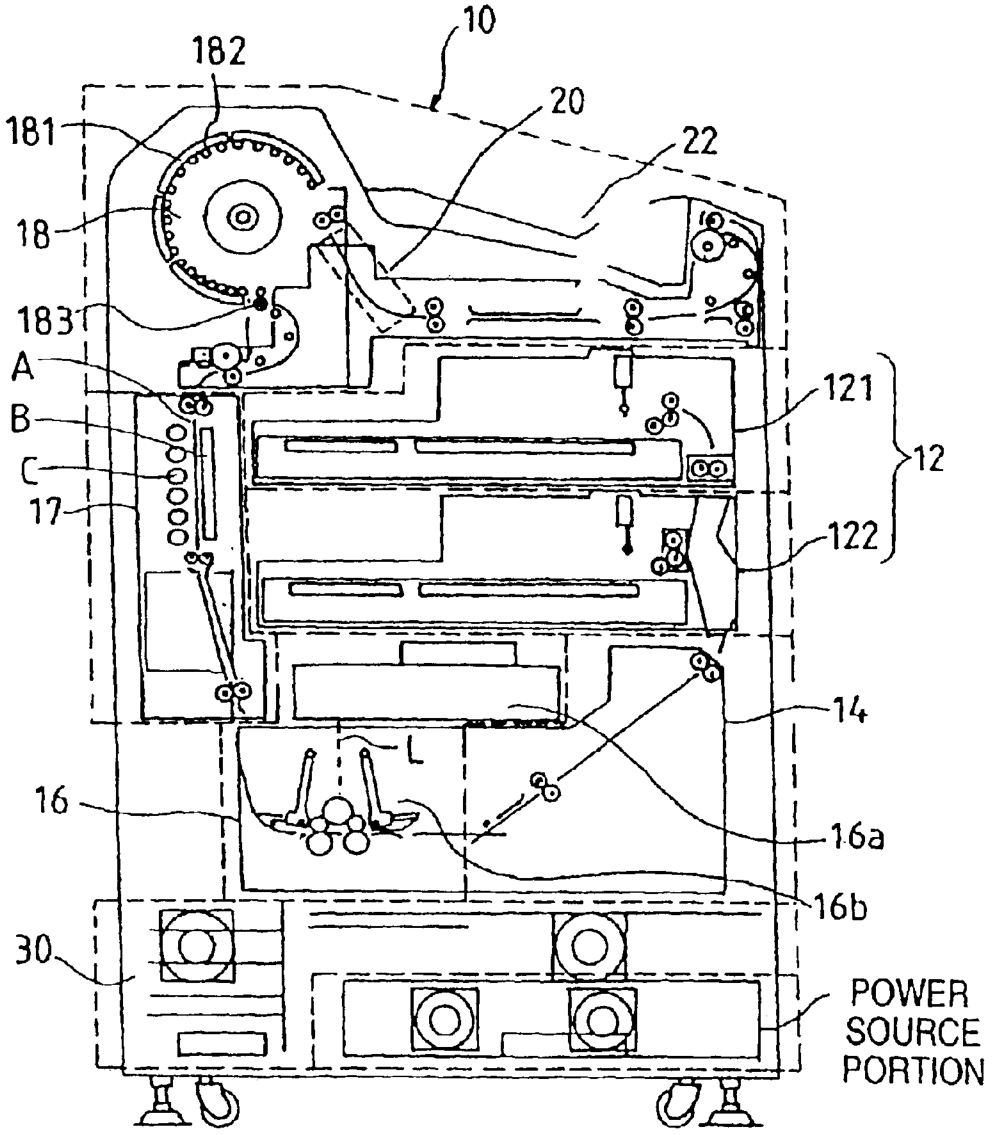
FIG. 3 is a schematic view showing the overall state of the heat developing apparatus according to the present invention.

FIG. 3 is a schematic view showing a dry-system heat developing apparatus according to a first embodiment of the present invention shown in FIG. 1.

Referring to FIG. 3, a heat developing apparatus 10 is an apparatus which uses a heat developing recording material which is not required to be subjected to a wet developing process. An operation for scanning and exposing with light beam L in the form of a laser beam is performed to expose the heat developing recording material so that a latent image is formed. Then, the heat developing apparatus 10 performs heat development to obtain a visible image. Then, the heat developing recording material is cooled to the room temperature so that an image is formed. Therefore, the heat developing apparatus 10 has a basic structure incorporating a heat-developing-recording-material supply portion 12, a film locating portion (width aligning portion) 14, a recording portion (an image exposing portion) 16, a heat developing portion 18 and a cooling portion 20 sequentially disposed in the direction in which the heat developing recording material is conveyed.

The heat developing recording material is a heat developing recording material with which an image is recorded (exposed) with a laser beam (for example, a laser beam). Thus, color is developed owing to heat development. The photosensitive and thermosensitive recording material is a heat developing recording material with which a light beam is used to record (expose) an image. Then, heat development is performed to develop color. As an alternative to this, a heat mode (heat) of a laser beam or a thermal head is used to record an image and simultaneously develop color. Then, irradiation with light is performed to fix the image.

The dry developing method is exemplified by the following methods.

(1) The exposed photosensitive material is superimposed on an image receiving material so as to heat (apply pressure if necessary) the materials. Thus, a image corresponding to a latent image formed on the photosensitive material owing to the exposure is transferred to the image receiving material (for example, refer to Japanese Patent Laid-Open No. 5-113629, Japanese Patent Laid-Open No. 9-258404, Japanese Patent Laid-Open No. 9-61978, Japanese Patent Laid-Open No. 8-62803, Japanese Patent Laid-Open No. 10-71740, Japanese Patent Laid-Open No. 9-152705, Japanese Patent Application No. 10-90181, Japanese Patent Application No. 10-13326 and Japanese Patent Application No. 10-18172).

(2) An exposed photosensitive material and a material which must be processed are superimposed so as to be heated. Thus, an image corresponding to a latent image formed on the photosensitive material owing to the exposure is formed on the photosensitive material (for example, refer to Japanese Patent Laid-Open No. 9-274295 and Japanese Patent Application No. 10-17192).

(3) A photosensitive material incorporating a photosensitive layer having a binder in which silver halide serving as a photocatalyst, silver salt serving as an image forming substance or a reducing agent for silver ions is dispersed is exposed. Then, the photosensitive material is heated to a predetermined temperature so that a latent image formed owing to the exposure is formed into a visible image (for example, refer to "Thermally Processed Silver Systems", disclosed by B. Shely (Imaging Processes and Materials) Neblette 8-th edition, edited by Sturge, V. Walworth and A shepp, pp. 2, 1996), Research Disclosure 17029 (1978), vol. EP803764A1, vol. EP803765A1 and Japanese Patent Laid-Open No. 8-211521).

(4) A method using a photosensitive and thermosensitive recording material with which a photosensitive and thermosensitive recording layer is adapted to electron donative colorless dye capsulated in a heat responsible microcapsule and a compound having an electron acceptor and polymerizable vinyl monomer portion in the same molecule thereof and a heat developing photosensitive material containing a light polymerizable initiator on the microcapsule (for example, Japanese Patent Laid-Open No. 4-249251). A method with which a photosensitive and thermosensitive recording material uses electron donative color dye capsulated in a heat responsible microcapsule and heat developing photosensitive material disposed on the outside of the microcapsule and containing polymerizable vinyl monomer and a light polymerization initiator (for example, Japanese Patent Laid-Open No. 4-211252).

The above-mentioned heat developing photosensitive materials composed of the above-mentioned materials are formed into a laminate (a stack) of a predetermined unit, which is usually about 100 sheets. Moreover, the laminate is wrapped in a bag or a band so as to be formed into a package. The package is accommodated in a magazine having the corresponding size. The magazines are mounted on the corresponding portions of the heat-developing-recording-material supply portion 12 shown in FIG. 3.

The heat-developing-recording-material supply portion 12 incorporates an upper sheet accommodating portion 121 and a lower sheet accommodating portion 122. The heat developing photosensitive materials accommodated in the corresponding steps through the magazines and having different sizes (for example, a B4-size and a center folded film size). Either of the heat developing photosensitive material can selectively be used. In accordance with a print command, the following sequential process is performed.

In a state in which the cover of the magazine is opened, a suction cup of the sheet feeding mechanism selects the heat developing photosensitive material in the selected magazine is, one by one, extracted. The extracted heat developing photosensitive material is guided by the supply roller pair, the conveying roller pair and the conveying guides disposed at downstream positions in the direction of conveyance so as to be conveyed to the downstream width aligning portion 14.

The width aligning portion 14 aligns the position of the heat developing photosensitive material in the direction (hereinafter called a "widthwise direction") perpendicular to the conveying direction. Thus, the width aligning portion 14 aligns the position of the heat developing photosensitive material in the main scanning direction in the downstream recording portion 16, that is, so-called side resist is performed. Then, the conveying roller pair conveys the heat developing photosensitive material to the downstream recording portion 16. The method of performing the side resist in the width aligning portion 14 is not limited. For example, a method may be employed which uses a resist plate arranged to be made in contact with one end surface of the heat developing photosensitive material in the widthwise direction to locate the heat developing photosensitive material. Moreover, the foregoing method uses a pushing means, such as a roller, which pushes the heat developing photosensitive material in the widthwise direction so as to make the end surface in contact with the resist plate. Another method may be employed which uses the foregoing resist plate and a guide plate or the like which restrains the moving direction of the heat developing photosensitive material in the widthwise direction to make the same contact with the resist plate and arranged to be capable of moving to correspond to the widthwise size of the heat developing photosensitive material. Thus, a variety of known methods may be employed.

The heat developing photosensitive material conveyed to the width aligning portion 14 is, as described above, aligned in the direction perpendicular to the conveying direction. Then, the heat developing photosensitive material is conveyed to the downstream recording portion 16.

The recording portion 16 is a portion in which scanning and exposing with a light beam are performed to expose the heat developing photosensitive material to light. The recording portion 16 incorporates an exposing unit 16*a* and a sub-scanning conveying means 16*b*. Recording (exposing) is performed in accordance with image data obtained by an individual photographing operation to control the output of the laser beam. Thus, scanning (main scanning) using the laser beam is performed. At this time, also the heat developing photosensitive material is moved into a predetermined direction (in the sub-scanning direction).

The exposing unit 16*a* incorporates a semiconductor laser for outputting a recording light beam L, a deflector for deflecting the laser beam in a one-dimensional direction and a fθ lens for recording the deflected laser beam on a recording material.

Light emitted from each laser-beam source is allowed to pass through a polarizing beam splitter so as to be formed into superimposed beams in the same phase. Then, the beam is allowed to pass through a reflecting mirror so as to be made incident on a polygonal mirror. Since the polygonal mirror is rotated, the laser beam is applied in the main scanning direction while the laser beam is being polarized.

In response to supply of an image signal, a control portion 30 operates a driver so as to control rotations of the polygonal mirror and the feeding motor. Thus, while the laser beam is being scanned in the main scanning direction of the heat developing photosensitive material, the heat developing photosensitive material is moved to the sub-scanning direction.

As for an operation for recording an image on the foregoing heat developing photosensitive material, refer to, for example, International Laid-Open No. WO95/31754 and International Laid-Open No. WO95/30934.

The heat developing photosensitive material on which the latent image has been formed in the recording portion 16 is, by the transferring portion 17 which is the means for conveying the heat developing recording material, conveyed to the heat developing portion 18. In the first embodiment of the present invention, the transferring portion 17 incorporates a plate heater B for heating the overall surface of the heat developing recording material and a plurality of thermosensors C for sampling and detecting the temperature of the overall surface of the heat developing recording material so that previous heating is performed. The previous heating operation will be described later (refer to foregoing description).

After the previous heating operation has been performed, the heat developing recording material is conveyed to the heat developing portion 18.

The heat developing portion 18 heats the heat developing recording material of a type subjected to the heat treatment. The heat developing portion 18 incorporates a plurality of plate heaters 181 serving as heating members heated to a required temperature to process the heat developing recording material and disposed in the direction in which the heat developing recording material is conveyed. The plate heaters 181 are sequentially disposed in a circular-arc configuration.

That is, the heat processing apparatus incorporating the plate heaters 181 is structured such that each of the plate heaters 181 is allowed to upwards project. Moreover, there are disposed a supply roller 183 serving as a conveying means for relatively moving (sliding) the heat developing recording material while the heat developing recording material is being made contact with the surface of each of the plate heaters. In addition, there is provided a pressing roller 182 for conducting heat from each plate heater to the heat developing recording material. Thus, conveyance is performed such that the leading end of the heat developing recording material is pressed against the plate heaters 181. As a result, buckling of the heat developing recording material can be prevented.

The pressing roller 182 and the plate heaters 181 form a passage for the heat developing recording material. The passage for the heat developing recording material has a size smaller than the thickness of the heat developing recording material. Thus, a state in which the heat developing recording material is smoothly held can be realized. Thus, buckling of the heat developing recording material can be prevented. At the two ends of the passage for the heat developing recording material, there are disposed a supply roller pair and a discharge roller paper which are means for conveying the heat developing recording material.

As a matter of course, the above-mentioned warped plate heaters 181 are an example. Another structure may be employed which incorporates flat plate heaters or a heating drum which has an endless belt and a separating claw.

The heat developing recording material discharged from the heat developing portion 18 is carefully cooled by the cooling portion 20 in such a manner that occurrence of a crease is prevented and undesirable curl is not formed. The heat developing recording material discharged from the cooling portion 20 is, by the conveying roller pair, guided to the guide plate so as to be accumulated into a tray 22 from the discharged roller pair.

The heat developing apparatus according to the present invention incorporates a plurality of thermosensors C disposed in the transferring portion 17 at an intermediate position of the passage by the conveying roller pair from the recording portion 16 to the heat developing portion 18. The thermosensors C samples and detects the temperature of the overall surface of the heat developing recording material A. With the foregoing structure, the heat developing recording material A on which the latent image has been formed owing to exposure is not directly conveyed to the heat developing portion 18. In the transferring portion 17, the heat developing recording material A is first heated by the plate heater B. The heat of the plate heater B is made to be a temperature TK not lower than a glass transition temperature TG and not higher than heat development start temperature TH. More particularly, the temperature is made to be slightly lower than the heat development start temperature.

The output of each of the plural thermosensors C is supplied to a comparator (not shown) disposed in, for example, the control unit 30. The comparator performs a comparison to determined whether or not the temperature of the overall surface of the heat developing recording material A has been raised to the required temperature. When the temperature of the overall surface of the heat developing recording material A has been raised to the required temperature, a control command is issued to convey the heat developing recording material A to the heat developing portion 18.

Since the foregoing structure is employed, the heat developing recording material A is not first conveyed to the heat developing portion 18. As an alternative to this, the overall surface of the heat developing recording material A is first uniformly heated to a temperature not lower than the glass transition temperature TG. Therefore, the rigidity of the overall surface of the heat developing recording material A is decreased. As a result, asperities of the surface of the heat developing recording material A can be removed. Hence it follows that the overall surface of the heat developing recording material A is uniformly made contact with the plate heaters 181 in the heat developing portion 18 disposed next. As a result, heating of the overall surface of the heat developing recording material A is simultaneously performed. It leads to a fact that the overall surface of the heat developing recording material A is free from irregularity of the density.

Heat radiation from the two end portions of the heat developing recording material A in the widthwise direction takes place greatly as compared with heat radiation from the central portion. Therefore, the two end portions must intensely be heated as compared with the central portion. Therefore, the plate heater B is divided into a plurality of sections (at least three sections) in the widthwise direction so as to independently apply heat.

As a matter of course, the plate heater B is an example. Another structure may be employed in which another heating roller or a heating drum incorporating an endless belt and a separating claw is disposed.

In the first embodiment, the individual plate heater B is disposed in a passage 17 in front of the heat developing portion 18. A second embodiment has a structure that the individual plate heater B is not provided for the transferring portion 17 in front of the heat developing portion 18. As an alternative to this, the plate heaters 181 of the heat developing portion 18 is structured to be capable of raising the temperature to two temperature levels.

Therefore, the second embodiment incorporates a plurality of thermosensors for sampling and extracting the temperatures of the overall surface of the heat developing recording material A, the plural thermosensors being disposed in the heat developing portion 18. Thus, control of heating performed by the plate heaters 181 is performed to realize two levels of temperatures which are (1) a predetermined first heating temperature not lower than a glass transition temperature of the heat developing recording material and not higher than heat development start temperature and (2) a predetermined second heating temperature not lower than the heat development start temperature.

Since the structure is arranged as described above, the heat developing recording material A on which the latent image has been formed owing to the exposure is directly conveyed to the heat developing portion 18. Thus, the heat developing recording material A is heated by the plate heaters 181. As a substitute for directly heating to the temperature not lower than the heat development start temperature TH, the required heating temperature of the plate heaters 181 is made to be a temperature TK not lower than a glass transition temperature TG which is the first heating temperature and not higher than heat development start temperature TH. In particular, the temperature is slightly lower than the heat development start temperature. The plural thermosensors sample and detect the temperature of the overall surface of the heat developing recording material A. The outputs of the thermosensors are supplied to the comparator. Therefore, the overall surface of the heat developing recording material A is first heated by the plate heaters 181 to the first heating temperature. Then, the comparator performs a comparison to determine whether or not the temperature of the overall surface of the heat developing recording material A has been raised to the first heating temperature TK. If the temperature of the overall surface of the heat developing recording material A has been raised to the first heating temperature TK, the plate heaters 181 starts heating to raise the temperature to a predetermined temperature which is a second heating temperature and which is not lower than the heat development start temperature TH.

As a result of employment of the above-mentioned structure, the overall surface of the heat developing recording material A can uniformly be heated to a level not lower than the glass transition temperature. As a result, the rigidity of the overall surface of the heat developing recording material A can be decreased. The asperities of the surface of the heat developing recording material A can be removed. Therefore, the overall surface of the heat developing recording material A can uniformly be made contact with the plate heaters 181 disposed in the heat developing portion 18 disposed next. As a result, heat development of the overall surface of the heat developing recording material A is simultaneously started. Therefore, the overall surface of the heat developing recording material A is free from irregularity of the density.

Since the heat developing recording material A is, in the heat developing portion 18, heated to the first heating temperature. Therefore, the plate heater B according to the present invention can be omitted.

As can be understood from the foregoing description, the conventional apparatus encounters irregularity of the density over the surface of the heat developing recording material. However, the apparatus according to the present invention has the structure that the overall surface of the heat developing recording material is first uniformly heated to a temperature not lower than the glass transition temperature. Therefore, the rigidity of the overall surface of the heat developing recording material can be decreased, causing the asperities of the surface of the heat developing recording material to be removed. Hence it follows that the overall surface of the heat developing recording material can uniformly be made contact with the plate heater in the heat developing portion. As a result, heat development of the overall surface of the heat developing recording material is simultaneously started. Hence it follows that the overall surface of the heat developing recording material is free from irregularity of the density.

What is claimed is:

1. A heat developing apparatus comprising:

a recording portion for exposing a heat developing recording material with a light beam to form a latent image;

a heat developing portion for heating said heat developing recording material by a heating medium thereof to perform heat development;

a previously-heating portion for heating the overall surface of said heat developing recording material on a base layer to a predetermined temperature not lower than a glass transition temperature and not higher than heat development start temperature, wherein the glass transition temperature is a glass transition point of the base layer;

a plurality of thermosensors for sampling the temperatures of the overall surface of said heat developing recording material; and a comparator for performing a comparison whether or not all of the temperatures detected by said thermosensors have been raised to said predetermined temperature are disposed between said recording portion and said heat developing portion, wherein after said comparator has detected that all of the temperatures detected by said thermosensors and said predetermined temperature substantially coincide with one another, said developing operation is started.

2. A heat developing apparatus according to claim 1, further comprising a conveying means for conveying said heat developing recording material from said recording portion to said heat developing portion, wherein after said comparator has detected that all of the temperatures detected by said thermosensors and said predetermined temperature substantially coincide with one another, the conveying means starts operating.

3. A heat developing apparatus according to claim 1, wherein said previously heating portion are divided into a plurality of sections in the widthwise direction of said heat developing recording material and controlled such that the temperatures of said sections are independently controlled.

4. A heat developing apparatus according to claim 1, wherein heating portions of said previously heating portion divided into said plural sections disposed at the two ends of the heat developing recording material in the widthwise direction are controlled to apply greater heat as compared with heating portions disposed in the central portion of said heat developing recording material in the widthwise direction.

5. A heat developing apparatus comprising according to claim 1, further comprising a heating control portion which is capable of controlling the heat of sand heat developing portion to two temperature levels including a first heating temperature not lower than a glass transition temperature and not higher than heat development start temperature and a second heating temperature not lower than the heat development start temperature, wherein when said comparator has detected that all of the temperatures detected by said thermosensors and said first heating temperature have substantially coincided with one another after an operation for controlling the first heating temperature has been started, said heating control portion issues a command to start a control operation of the second heat temperature.

* * * * *